(12) United States Patent
Gilet et al.

(10) Patent No.: US 11,509,183 B2
(45) Date of Patent: Nov. 22, 2022

(54) INVERTER COMPRISING A PART FORMING A SET-BACK FROM A FIRST PART OF THE INVERTER

(71) Applicant: Valeo Siemens eAutomotive France SAS, Cergy (FR)

(72) Inventors: Olivier Gilet, Viarmes (FR); Anthony Lamarche, Villepreux (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 33 days.

(21) Appl. No.: 16/834,869

(22) Filed: Mar. 30, 2020

(65) Prior Publication Data
US 2020/0321885 A1 Oct. 8, 2020

(30) Foreign Application Priority Data
Apr. 5, 2019 (FR) ...................................... 1903710

(51) Int. Cl.
*H02K 5/04* (2006.01)
*H02K 11/33* (2016.01)
(Continued)

(52) U.S. Cl.
CPC ................ *H02K 5/04* (2013.01); *H02K 5/00* (2013.01); *H02K 7/006* (2013.01); *H02K 11/33* (2016.01); *H02M 7/003* (2013.01)

(58) Field of Classification Search
CPC .......... H02K 5/04; H02K 11/33; H02K 7/006; H02K 11/30; H02K 5/225; H02K 5/22; H02K 11/38; H02K 11/02; H02K 11/40; H02K 3/28; H02K 5/00; H02K 5/10; H02K 5/02; H02K 5/06; H02K 5/08;
(Continued)

(56) References Cited

U.S. PATENT DOCUMENTS 9,768,671 B2   9/2017 Hattori et al.
10,208,853 B2   2/2019 Roos et al.
(Continued)

FOREIGN PATENT DOCUMENTS

EP   2461035 A1   6/2012
KR   101927625 B1   3/2019
WO   WO 2016/087632 A1   6/2016

OTHER PUBLICATIONS

Search Report from French Intellectual Property Office on corresponding FR application (FR1903710) dated Oct. 17, 2019.

*Primary Examiner* — Alexander A Singh
(74) *Attorney, Agent, or Firm* — KOS IP Law LLP

(57) ABSTRACT

The invention relates to an inverter, notably configured to be on-board an automobile vehicle, comprising:
power components configured to convert DC electrical energy into AC electrical energy so as to supply an electric motor, notably configured to drive the vehicle,
a casing housing the components of the inverter and comprising a first part forming a first housing, housing said power components and a second part forming a second housing, housing filtering components configured to filter DC electrical energy supplied to the power components, notably from a battery of the vehicle,
said second casing part being formed at least in part by a set-back with respect to said first part from an outer face of the casing comprised in the first part.

11 Claims, 4 Drawing Sheets

(51) Int. Cl.
*H02K 7/00* (2006.01)
*H02M 7/00* (2006.01)
*H02K 5/00* (2006.01)

(58) Field of Classification Search
CPC .. B60L 15/007; B60L 2210/40; H02M 7/003; Y02T 10/72; Y02T 10/70; Y02T 10/7072; Y02T 10/64; Y02T 90/14
USPC ..................................................... 310/89, 71
See application file for complete search history.

(56) References Cited

U.S. PATENT DOCUMENTS

| | | | |
|---|---|---|---|
| 2003/0200761 A1* | 10/2003 | Funahashi | F04B 35/04 62/228.4 |
| 2010/0247349 A1* | 9/2010 | Asai | F04B 39/12 417/410.1 |
| 2010/0303648 A1* | 12/2010 | Watanabe | H02K 11/33 417/411 |
| 2011/0163705 A1* | 7/2011 | Sato | H02K 11/024 318/400.24 |
| 2014/0306563 A1* | 10/2014 | Oyama | H02K 11/02 310/71 |
| 2017/0232831 A1* | 8/2017 | Agata | B60K 6/405 310/54 |
| 2017/0264172 A1* | 9/2017 | Meunier | B60K 1/00 |

\* cited by examiner

US 11,509,183 B2

INVERTER COMPRISING A PART FORMING A SET-BACK FROM A FIRST PART OF THE INVERTER

TECHNICAL FIELD

The present invention relates to an inverter, notably configured to be on-board an automobile vehicle, in particular an electric or hybrid vehicle. The invention also relates to an assembly comprising said inverter and an electric motor, notably configured to drive the wheels of the automobile vehicle.

PRIOR ART

Technologies linked to electric or hybrid vehicles have developed rapidly over recent years. Typically, an electric or hybrid vehicle comprises an electric motor generating a rotational force, an inverter to control said electric motor, a battery to supply said inverter, and also a gearbox to transfer torque to the wheels of the vehicle from the electric motor. It is aimed to place these components in the vehicle in such a way as to limit the bulk of the components in the vehicle. To this end, it is known to provide an integrated assembly wherein these components are mounted one with the other in order to optimize the space in the vehicle and to avoid cables covering distances in the vehicle. However, a simple mounting of the components one on the other does not guarantee a sufficient space saving in the vehicle. The inner arrangement of each component, in particular the inverter, also affect the bulk of the assembly.

An inverter is thus sought having an inner arrangement favoring its mounting with other components of an assembly notably forming a drive system of a vehicle.

SUMMARY

To this end, the invention relates to an inverter, notably configured to be on-board an automobile vehicle, comprising:

power components configured to convert DC electrical energy into AC electrical energy so as to supply an electric motor, notably configured to drive the vehicle, a casing, housing the components of the inverter and comprising:

a first part forming a first housing, housing said power components and a second part forming a second housing, housing filtering components and configured to filter DC electrical energy supplied to the power components, notably from a battery of the vehicle, said second casing part being formed at least in part by a set-back with respect to said first part from an outer face of the casing comprised in the first part.

Said second part extends from the first part along a transversal direction, notably perpendicular, with respect to the first part. Thus, when the inverter is mounted in a vehicle, the space formed between the first casing part and the second casing part may receive another component of the vehicle, notably the electric motor supplied by the inverter, which improves the integration of the components in the vehicle.

According to an embodiment, the set-back forms an outer face of the casing comprised in the second part and extends along a transversal direction, in particular perpendicular, with respect to the outer face of the casing comprised in the first part.

According to an embodiment, an outer face of the second casing part comprises a first outer connector of the inverter configured to connect the inverter to a DC electrical energy source, notably the battery of the vehicle.

According to an alternative, said first connector is at a position distal from the first casing part, said filtering components being positioned between this distal position and the set-back point between the first part and the second part.

According to an alternative, said connector is mounted on the outer face of the second part which forms a set-back from the outer face of the first part.

According to an embodiment, the second casing part further comprises a second outer connector configured to connect the inverter with a charger, notably an electrical charger configured to charge a battery of the vehicle.

According to an embodiment, a passage inside the casing enables communication between the first and the second housings.

According to an embodiment, the second part comprises an opening configured to receive a drive shaft of a vehicle when the inverter is mounted in a vehicle, in particular an axle for driving the wheels of the vehicle.

According to an alternative, said opening is formed in said set-back.

According to an alternative, said opening is formed in a portion of the second casing part which is outside the second housing, housing the filtering components.

The invention further relates to an assembly comprising an inverter according to the invention and an electric motor configured to be driven by said inverter.

According to an embodiment, said electric motor is housed at least in part in the space formed between the first casing part and the second casing part, in particular in the space formed between the outer face of the first part and the set-back.

According to an alternative, an opening of the electric motor and an opening of the inverter come against each other in the space formed between the first casing part and the second casing part so as to enable a leak-tight passage for an electrical connection between the inverter and the electric motor.

According to a particular alternative, an opening of the casing containing the stator of the electric motor and an opening of the casing of the inverter come against each other in the space formed between the first casing part and the second casing part so as to enable a leak-tight passage for an electrical connection between the inverter and the motor.

BRIEF DESCRIPTION OF THE DRAWINGS

The invention will be better understood and other details, characteristics and advantages of the invention will become clear on reading the following description given as a non-limiting example with reference to the appended figures in which.

Figure 1:
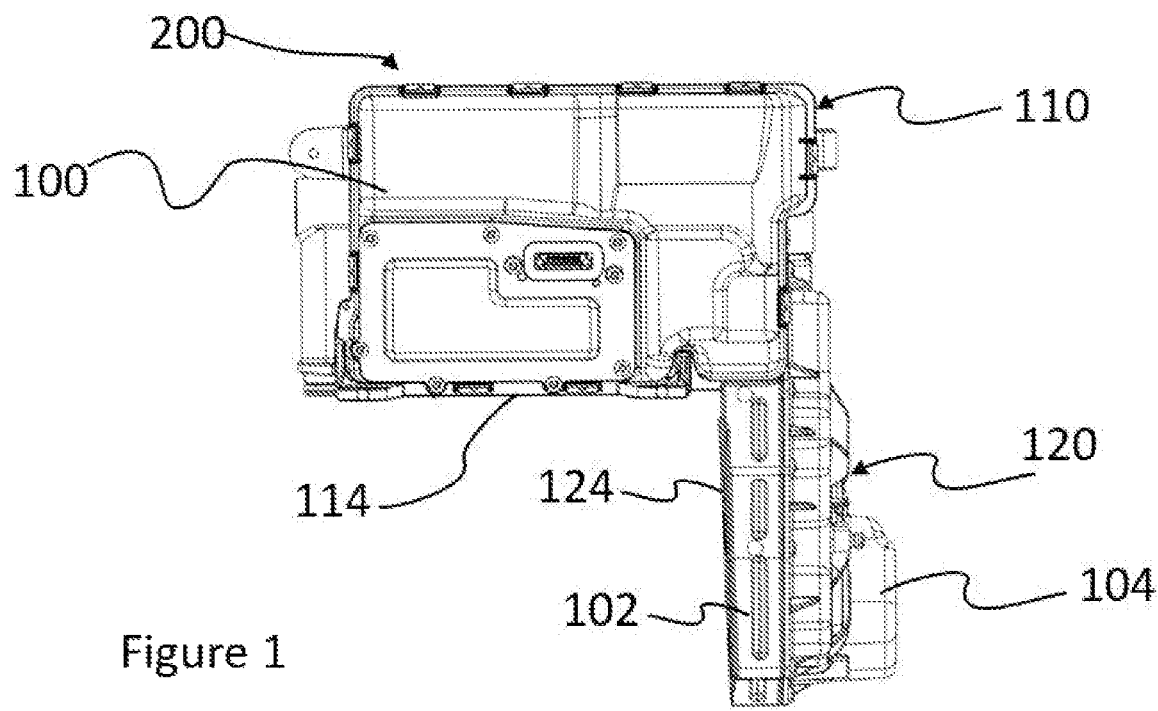
FIG. 1 represents an example of inverter according to an embodiment.

It should be noted that the figures set out the invention in a detailed manner for implementing the invention, said figures obviously being able to serve to better define the invention if need be.

DETAILED DESCRIPTION

The exemplary inverter 200 comprises a casing 100 wherein the components of the inverter 200 are housed. The casing 100 comprises a first part 110 which forms a first housing, housing power components of the inverter 200, and a second part 120 which forms a second housing 122, housing filtering components 125 of the inverter 200. The second part 120 of the casing 100 is formed at least in part by a set-back 124 from an outer face 114 of the casing 100 comprised in the first part 110. The second part 120 thus extends from the first part 110 along a transversal, or even perpendicular, direction with respect to the first part 110. Thus, the casing 100 delimits a space between the first part 110 and the second part 120 which is capable of receiving other components of a vehicle when the inverter is mounted therein, or other components of an assembly configured to drive a vehicle. In particular, the set-back 124 forms an outer face of the casing 100, this outer face being comprised in the second part 120 of the casing 100.

In particular, the casing 100 comprises outer walls 102 defining housings receiving the components. The edges of these outer walls 102 notably define an opening making it possible to introduce the components into the housings. These openings may next be closed by covers 104 coming against the edges of the walls 102. Notably, the outer walls 102 of the first part 110 define the first housing receiving the power components of the inverter 200. A cover 104 next closes said first housing. In particular, outer walls 102 extend from the set-back 124 to define the second housing 122, this second housing 122 receiving the filtering components 125 of the inverter 100. A cover 124 comes against the edges of these outer walls 102 of the second part 120 to close the housing 122 of the second part 120.

The power components are housed in the first housing of the inverter 200. The power components are configured to convert DC electrical energy into AC electrical energy to supply an electric motor supplied by the inverter 200. These power components notably comprise semiconductor components such as diodes and/or transistors through which passes the electrical energy supplying the electric motor. The first housing may comprise other components such as a control unit configured to control the electronic power components. Such a control unit is for example an electronic board on which are mounted control circuits; or a DC link capacitor which is connected to the input of the power components receiving the DC electrical energy.

The filtering components 125 are configured to filter DC electrical energy supplied to the power components. The filtering components 125 notably comprise one or more electrical connection bars 126 configured to conduct a current between an input of the inverter 200 connected to a DC source and an input of the power components. The electrical connection bar 126 comprises for example an electrically conducting bar provided with an electrically insulating covering, except at the level of the electrical terminals of the electrical connection bar 126. The filtering components 125 may further comprise cores 127 and capacitors 128.

The set-back 124 comprises a first connector 123 to connect the inverter 200 to a DC electrical energy source, notably to a battery of the vehicle. This connector 123 could be on another outer face of the second part 120, for example on the outer wall 102 or on the cover 104 of the second part 120. The first connector 123 is in particular at a position distal from the first casing part 110. The filtering components 125 extend between this distal position and the set-back point between the first casing part 110 and the second casing part 120. The first connector 123 is thus remote from the first casing part 110. Thus, the connection with a battery is little affected by the bulk of the first casing part 110.

The second casing portion 120 may further comprise a second outer connector 129 configured to connect the inverter 200 with an electrical charger. Such an electrical charger is notably on-board the vehicle and configured to charge a battery of the vehicle from an electrical network outside the vehicle. The electric battery is furthermore configured to supply the inverter 200 through the first connector 123 and the filtering components 125. The second connector 129 forms the electrical connection between the electrical connection bars 126 of the filtering components 125 and the charger. Thanks to the second connector 129, the charger is connected to the battery through the second connector 129, the electrical connection bars 126 and the first connector 123.

Figure 2:
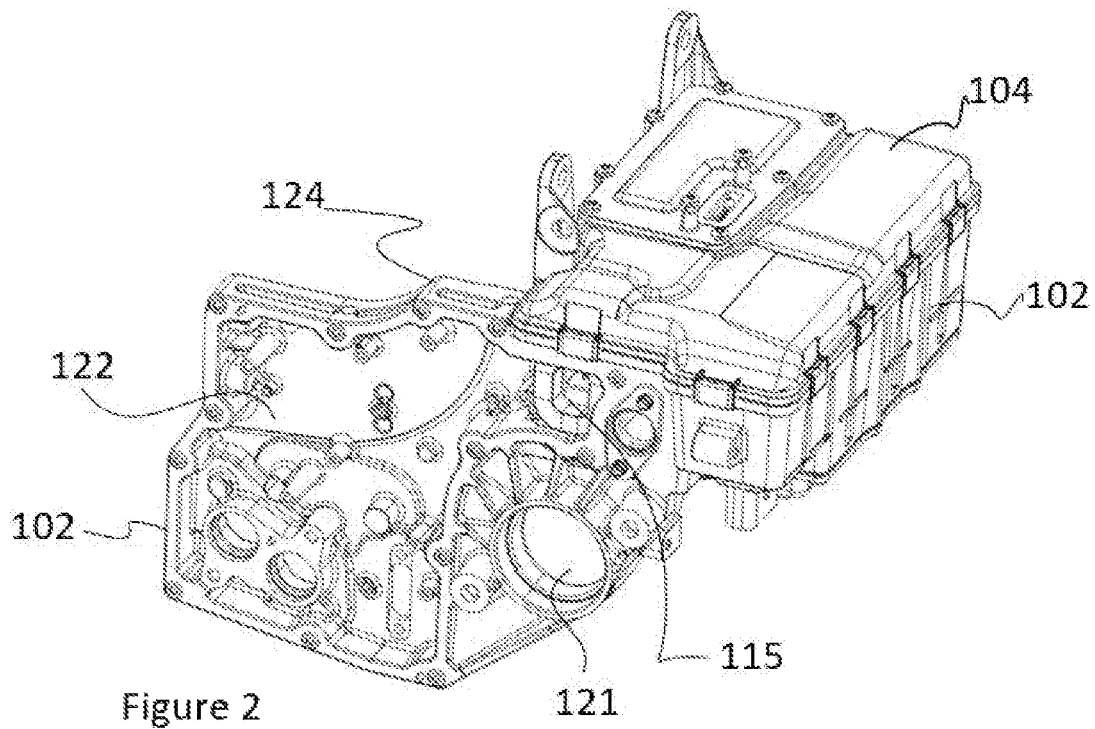
FIG. 2 shows a partial view of the inverter.
Figure 3:
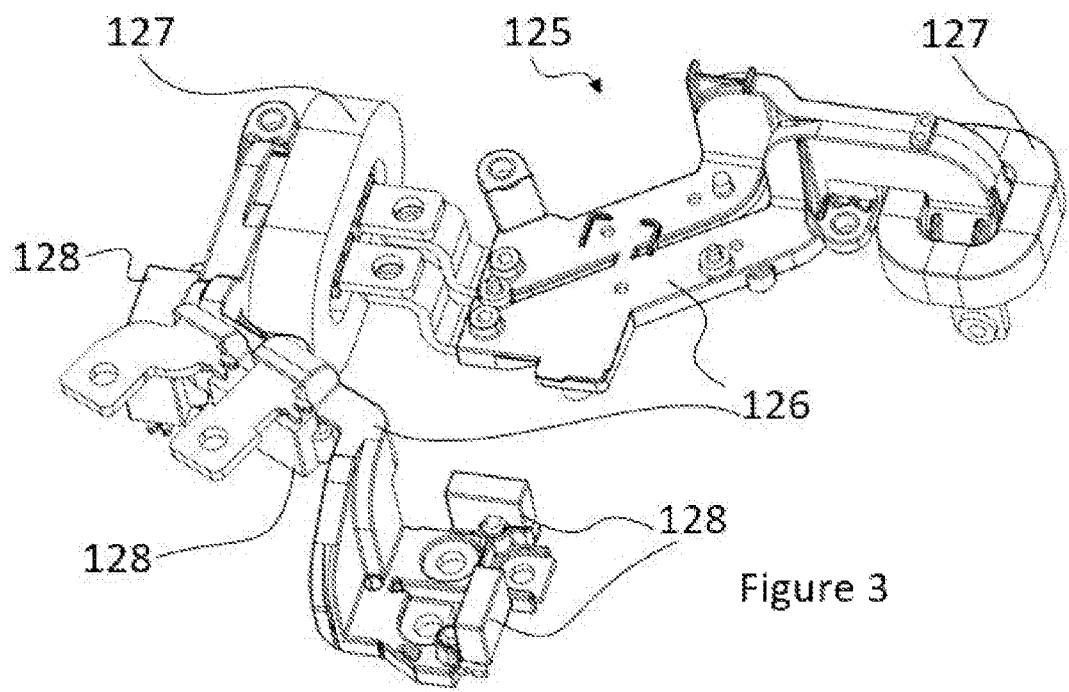
FIG. 3 illustrates an example of filtering components of the inverter.
Figure 4:
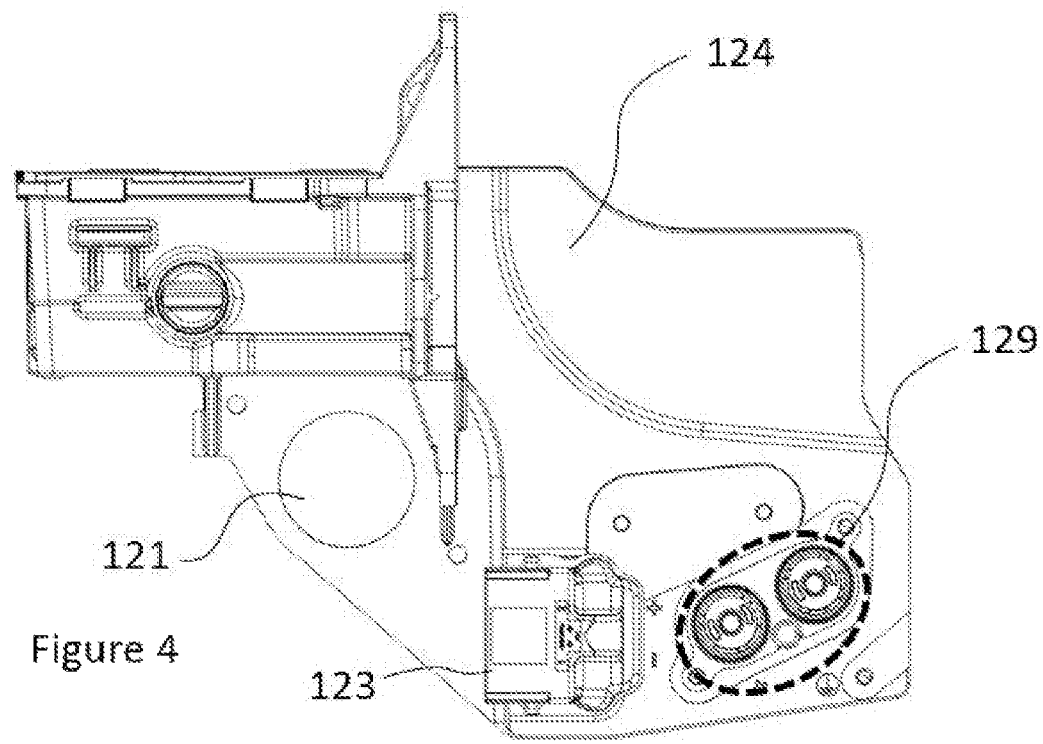
FIG. 4 shows another view of the inverter.

A passage 115, visible in FIG. 2, is arranged inside the casing 100 to form a passageway between the first housing and the second housing 122. Thus, the connection between the filtering components 125 and the power components is made inside the casing 100. Notably, this passage 115 is arranged in an inner wall of the casing 100 which is common to the first housing and to the second housing 122.

The set-back 124 notably comprises an opening 121 configured to receive a drive shaft of a vehicle when the inverter 200 is mounted in the vehicle. For example, the opening 121 receives a drive shaft coming from a gearbox. Thus, the inverter 200 may be integrated in the drive system of the vehicle, which improves compactness in the vehicle. Moreover, the casing 100 of the inverter 200 contributes to the support of the drive shaft. The opening 121 could be elsewhere in the second part 120, for example in an excrescence of the cover 104 of the second part 120 or in an excrescence extending from the set-back 124. In particular, the opening 121 is outside the second housing 122. The opening 121 does not emerge into the second housing 122, which avoids problems of sealing the second housing 122.

Figure 5:
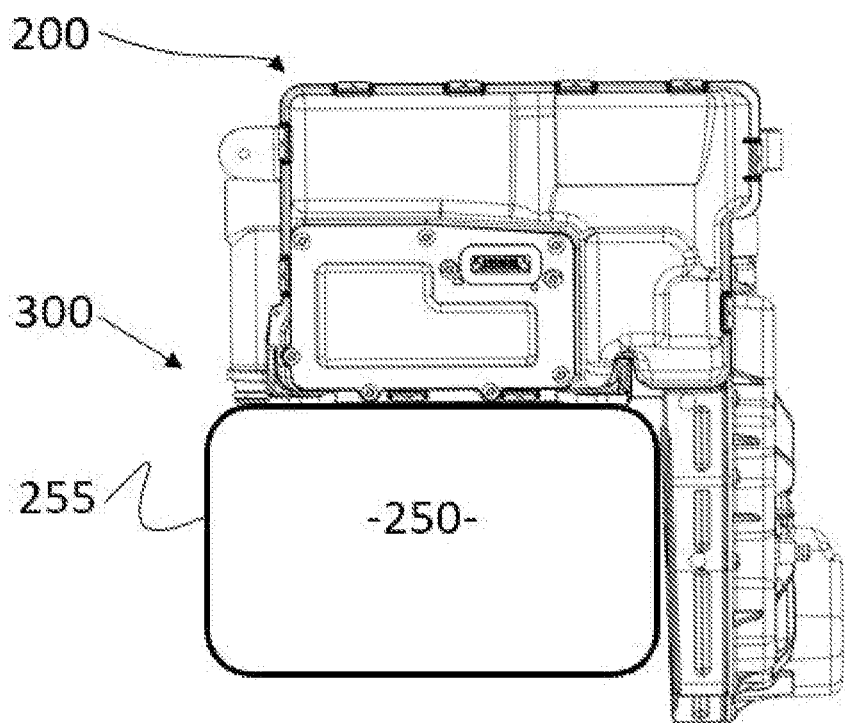
FIG. 5 represents an example of assembly comprising the inverter.

The inverter 200 may be associated with an electric motor 250 to form an assembly 300 illustrated schematically in FIG. 5. The electric motor 250 is housed in the space formed between the first part 110 and the second part 120 of the casing 100 of the inverter 200.

Figure 6:
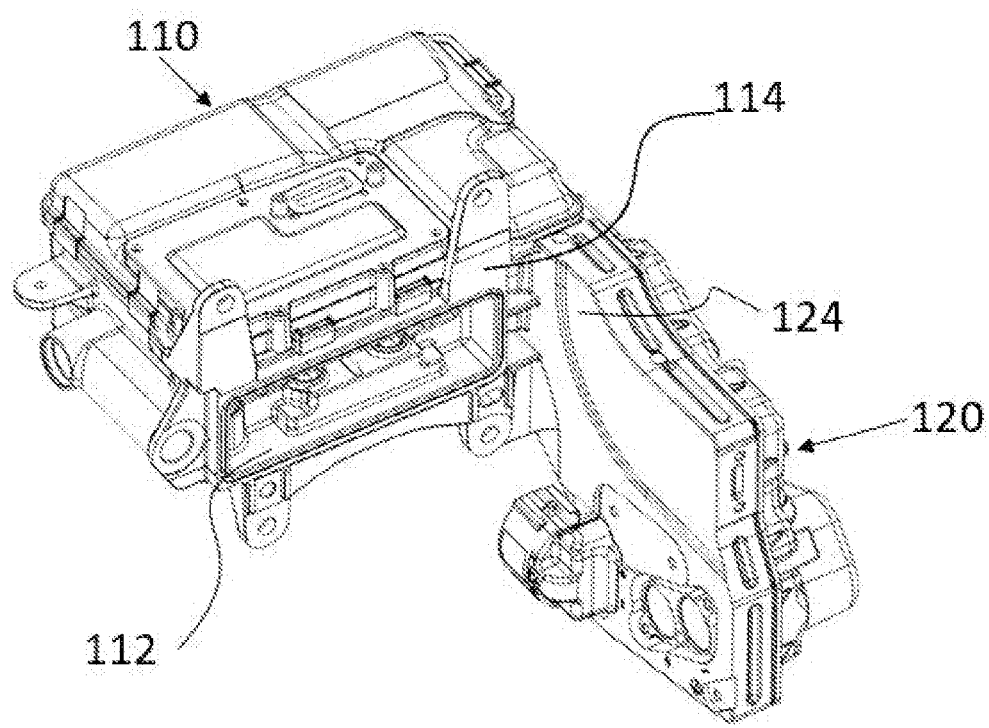
FIG. 6 shows another view of the inverter.

Notably, as illustrated in FIG. 6, in the space formed between the first casing part 110 and the second casing part 120, the inverter 200 comprises an opening 112 which comes against a corresponding opening of the electric motor 250, thus forming a passage for an electrical connection between the inverter 200 and the electric motor 250. The opening 112 of the inverter 200 is in particular comprised in the first casing part 110, more particularly in the outer face 114 of the first casing part 110 from which extends the set-back 124. Thus, the integration of the inverter 200 and the electric motor 250 in the assembly 300 is improved. In particular, the corresponding opening of the electric motor 250 is comprised in an outer wall of the casing 255 of the electric motor 250. Such a casing 255 comprises a stator and a rotor of the electric motor 250.

Figure 7:
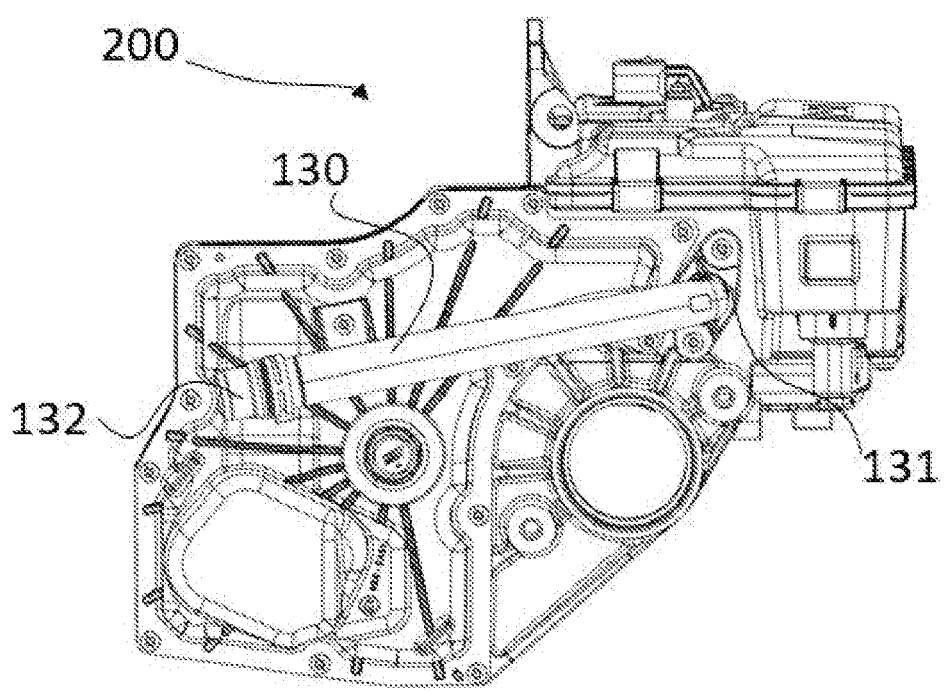
FIG. 7 represents an alternative of the inverter.

In an alternative, the inverter 200 comprises a circuit for cooling the power components. To this end, the cooling circuit is notably comprised in the first casing part 110. For example, as illustrated in FIG. 7, a tube 130 may then extend opposite the second casing part 120 to exchange a cooling liquid with a channel of the cooling circuit. In particular, the tube 130 extends opposite an outer face of the second casing part 120 which is opposite the set-back 124. Notably, the tube 130 comprises a first end 131 connected to the cooling circuit, and a second end 132 situated opposite an edge of the second casing part 120. Notably, the second end 132 of the tube 130, the first connector 123 and the second connector 129 are situated on or opposite the periphery of the second casing part 120 to facilitate their connections with the connections of the inverter 200 with other elements.

The assembly 300 is notably on-board a vehicle in order to drive the vehicle, in particular from a battery of the vehicle connected to the first connector 123 of the inverter 200. Notably, the assembly 300 may be mounted with a gearbox of the vehicle, a drive shaft of the gearbox coming into the opening 121 of the second part 120 of the casing 100 of the inverter 200.

The invention claimed is:
1. An inverter usable on-board an automobile vehicle, comprising:
   power components configured to convert DC electrical energy into AC electrical energy to supply an electric motor on-board a vehicle;
   a casing housing the power components of the inverter and comprising:
      a first part forming a first housing, housing said power components, and
      a second part forming a second housing, housing filtering components configured to filter DC electrical energy supplied to the power components;
   said second part being formed at least in part by a set-back with respect to said first part from an outer face of the casing comprised in the first part; and
   wherein the second part further comprises a second outer connector configured to connect the inverter with an electrical charger.

2. The inverter according to claim 1;
   wherein the outer face has a first surface section and the set-back comprises a second surface section transverse to the first surface section, and wherein the second surface section forms part of the second housing.
3. The inverter according to claim 1, wherein an outer face of the second part comprises a first outer connector of the inverter configured to connect the inverter to a DC electrical energy source.
4. The inverter according to claim 3, wherein said first outer connector is at a distal position from the first part, said filtering components being positioned between the distal position and a set-back point between the first part and the second part.
5. The inverter according to claim 1, wherein a passage inside the casing enables communication between the first and the second housings.
6. The inverter according to claim 1, wherein the second part comprises an opening configured to receive a drive shaft of a vehicle when the inverter is mounted in a vehicle, in particular an axle for driving the wheels of the vehicle.
7. The inverter according to claim 6, wherein said opening is formed in said set-back.
8. The inverter according to claim 6, wherein said opening is formed in a portion of the second part which is outside the second housing, housing the filtering components.
9. An assembly comprising the inverter according to claim 1 and an electric motor configured to be driven by said inverter.
10. The assembly according to claim 9, wherein said electric motor is housed at least in part in the space formed between the first part and the second part, in particular in the space formed between the outer face of the first part and the set-back.
11. The assembly according to claim 10, wherein an opening of the electric motor and an opening of the inverter come against each other in the space formed between the first part and the second part so as to enable a leak-tight passage for an electrical connection between the inverter and the electric motor.

* * * * *